United States Patent
Nakatsuka

(10) Patent No.: US 10,486,662 B2
(45) Date of Patent: Nov. 26, 2019

(54) DEVICE AND METHOD FOR CONTROLLING BRAKING DURING COLLISIONS

(71) Applicant: HONDA MOTOR CO., LTD., Tokyo (JP)

(72) Inventor: Masayuki Nakatsuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 96 days.

(21) Appl. No.: 15/558,784

(22) PCT Filed: Jan. 5, 2016

(86) PCT No.: PCT/JP2016/050104
§ 371 (c)(1),
(2) Date: Sep. 15, 2017

(87) PCT Pub. No.: WO2016/152178
PCT Pub. Date: Sep. 29, 2016

(65) Prior Publication Data
US 2018/0072283 A1    Mar. 15, 2018

(30) Foreign Application Priority Data

Mar. 20, 2015 (JP) ................................. 2015-058489

(51) Int. Cl.
*B60T 7/22* (2006.01)
*B60R 21/34* (2011.01)
(Continued)

(52) U.S. Cl.
CPC ................ *B60T 7/22* (2013.01); *B60R 21/34* (2013.01); *B60T 8/171* (2013.01);
(Continued)

(58) Field of Classification Search
CPC .................................. B60T 8/171; G08G 1/09
See application file for complete search history.

(56) References Cited

U.S. PATENT DOCUMENTS 2,232,726 A * 2/1941 Perez ...................... B60R 19/02
180/278
8,725,403 B2    5/2014 Aoki et al.
(Continued)

FOREIGN PATENT DOCUMENTS

DE    102005039307    3/2007
EP    2484573    8/2012
(Continued)

OTHER PUBLICATIONS

International Search Report, dated Mar. 22, 2016 (Mar. 22, 2016), Application No. PCT/JP2016/050104, 2 pages.
(Continued)

*Primary Examiner* — Rami Khatib
(74) *Attorney, Agent, or Firm* — Rankin, Hill & Clark LLP

(57) ABSTRACT

When a collision between a vehicle and a physical object is detected, a notification control unit transmits a notification command to a notification device. Upon receiving the notification command, the notification device notifies an external emergency notification center. While the notification device is notifying the emergency notification center, a brake control unit maintains the actuated state of a brake device and stops the vehicle. This configuration makes it possible to prevent any increase in accidents after a vehicle collision, and to prevent the driver from escaping.

4 Claims, 2 Drawing Sheets

(51) Int. Cl.
   *B60T 8/171*   (2006.01)
   *B60R 21/00*   (2006.01)
(52) U.S. Cl.
   CPC .................................................................................
   *B60R 2021/0027* (2013.01); *B60T 2201/022*
   (2013.01); *B60T 2201/024* (2013.01)

(56) References Cited

U.S. PATENT DOCUMENTS

| | | | | |
|---|---|---|---|---|
| 2009/0326820 | A1* | 12/2009 | Shimizu | B60T 7/22 701/301 |
| 2010/0114467 | A1* | 5/2010 | Samuel | G08G 1/162 701/119 |
| 2014/0132404 | A1* | 5/2014 | Katoh | B60R 21/013 340/436 |
| 2014/0180530 | A1* | 6/2014 | Wanami | B60R 21/0136 701/32.2 |
| 2015/0360655 | A1* | 12/2015 | Odate | B60T 7/22 701/70 |
| 2015/0360664 | A1* | 12/2015 | Svensson | B60T 7/12 701/70 |
| 2016/0063642 | A1* | 3/2016 | Luciani | G06Q 40/08 705/4 |

FOREIGN PATENT DOCUMENTS

| | | |
|---|---|---|
| JP | 2003-025938 | 1/2003 |
| JP | 2005-41334 | 2/2005 |
| JP | 2008-44520 | 2/2008 |
| JP | 2010-244167 | 10/2010 |
| JP | 2014-052883 | 3/2014 |
| JP | 2014-114008 | 6/2014 |
| JP | 2014123199 A * | 7/2014 ......... B60R 21/0136 |
| RU | 2484993 C1 | 6/2013 |

OTHER PUBLICATIONS

European Search Report dated Sep. 25, 2018, English text, 7 pages.
Japanese Office Action dated Mar. 20, 2018, English abstract included, 6 pages.
Russian Office Action and Search Report dated Aug. 31, 2018 with English translation, 12 pages.

* cited by examiner

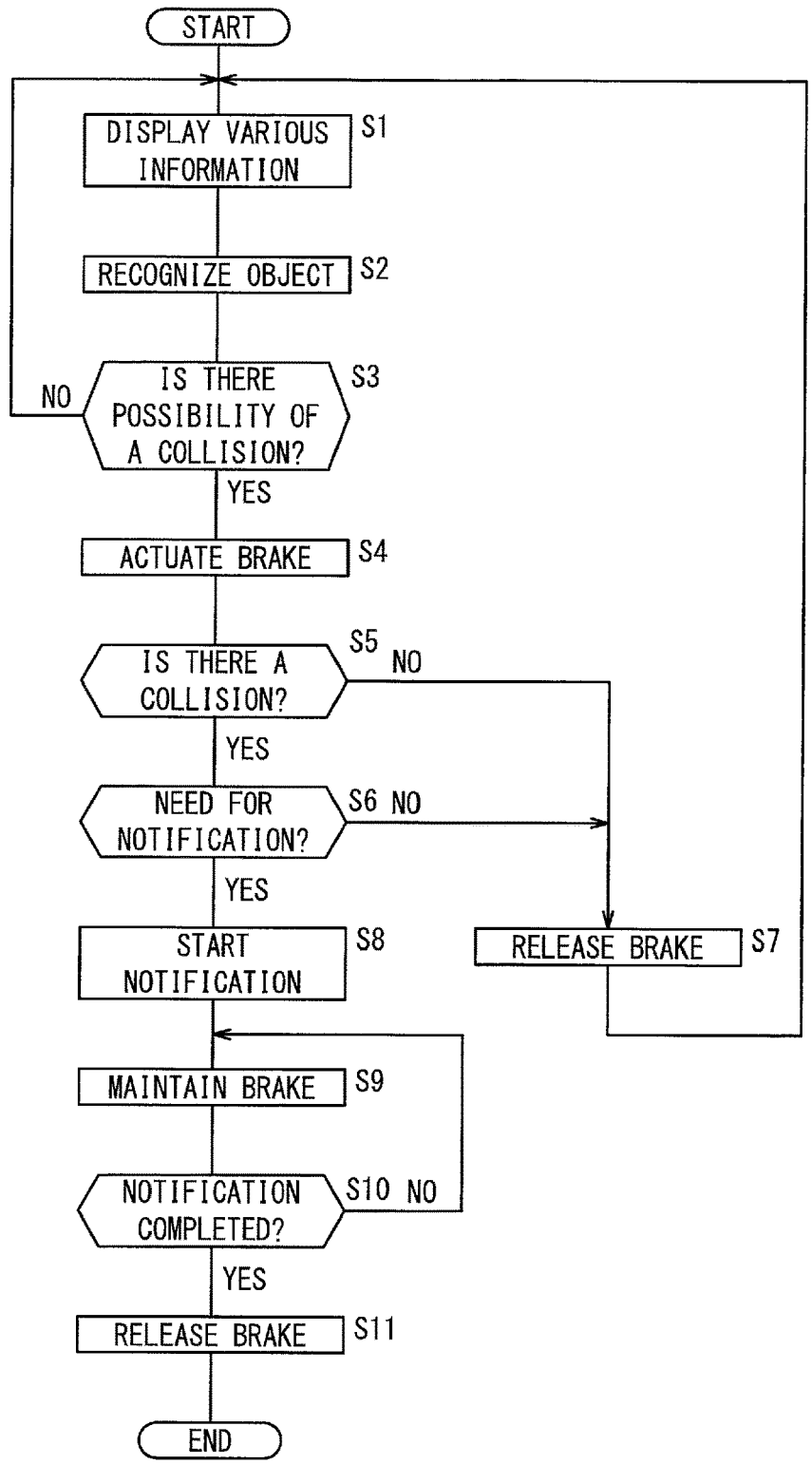

DEVICE AND METHOD FOR CONTROLLING BRAKING DURING COLLISIONS

TECHNICAL FIELD

The present invention relates to a device and method for controlling braking during a collision, which are adapted to automatically actuate a brake when a vehicle is involved in a collision.

BACKGROUND ART

Many vehicles currently in commercialization are equipped with a collision damage mitigation braking function (hereinafter referred to as an automatic braking function) adapted to automatically actuate a brake before and after a collision with an object. Conventionally, automatic brakes in mainstream use have been of types with the aim of decelerating the vehicle, as disclosed for example in Japanese Laid-Open Patent Publication No. 2008-044520 (see paragraph [0038], etc.). More recently, the types of automatic brakes are increasing for the purpose of stopping the vehicle.

Although automatic braking contributes to the suppression of accidents, such accidents cannot be completely prevented. When a vehicle collides with a pedestrian, it is necessary for the driver to promptly provide a notification concerning the accident, and if the pedestrian is injured, it is also necessary to provide care for the pedestrian. For example, in Japanese Laid-Open Patent Publication No. 2005-041334 (see abstract, paragraph etc.), it is indicated that a communications connection is established between a vehicle and an external organization (a vehicle management center, a police station, or the like), at the time that a collision occurs between the vehicle and a pedestrian.

Cases occur in which, after a vehicle collision, the driver may feel uncomfortable or upset, and thus may fail to actuate the parking brake. In such a state, if the driver carries out a communication with an external organization, the vehicle may start to move during the communication, and there is a possibility for the vehicle to become involved with an injured person on the road, and lead to an expansion of the accident. Further, there is also the possibility that an ill-intentioned driver may try to flee from the accident without providing any notification.

The technique according to Japanese Laid-Open Patent Publication No. 2008-044520 is not related to providing a notification after a collision has occurred. Although the technique according to Japanese Laid-Open Patent Publication No. 2005-041334 relates to providing a notification after a collision has occurred, such a technique does not associate the notification with a brake control, and no control of braking is carried out after the collision. Therefore, with the techniques according to Japanese Laid-Open Patent Publication No. 2008-044520 and Japanese Laid-Open Patent Publication No. 2005-041334, the above-described problems of expansion of the accident and fleeing of the driver from the scene of the accident cannot be solved.

The present invention has been devised taking into consideration the aforementioned problems, and has the object of providing a device and method for controlling braking during a collision, which makes it possible to prevent the accident from expanding after a vehicle collision, together with preventing the driver from fleeing from the scene of the accident.

The present invention is characterized by a device for controlling braking during a collision adapted to automatically actuate a brake before a collision or after a collision between a vehicle and an object, comprising a collision detecting unit configured to detect a collision between the vehicle and the object, a notification unit configured to issue a notification to exterior of the vehicle in an event that a collision between the vehicle and the object is detected by the collision detecting unit, and a brake control unit configured to maintain an actuated state of the brake during issuance of the notification by the notification unit.

In the present invention, the notification unit automatically notifies the external organization in response to a collision of the vehicle, and the brake control unit maintains the actuated state of the brake during issuance of the notification by the notification unit. According to the present invention, it is possible to provide a notification to the external organization immediately after the vehicle collision, and during a period while the notification is being made, it is possible to prevent the accident from expanding due to traveling of the vehicle. Further, since the actuated state of the brake is maintained and the vehicle is incapable of traveling during the notification, fleeing of an ill-intentioned driver from the scene of the accident can be prevented.

Further, in the present invention, the brake control unit may be configured to release maintenance of the actuated state of the brake after the notification by the notification unit is completed. If the actuated state of the brake is released upon completion of the notification, as in the present invention, it is possible to reliably notify the external organization, and further to reliably prevent an ill-intentioned driver from fleeing from the scene of the accident.

Further, in the present invention, there may further be provided an object recognizing unit configured to recognize the object, wherein the notification unit is configured to issue the notification to the exterior of the vehicle in an event that the object recognized by the object recognizing unit is a human being, and the brake control unit may be configured to maintain the actuated state of the brake in the event that the object recognized by the object recognizing unit is a human being. As in the present invention, in the event that the object having collided with the vehicle is a human being, and if the actuated state of the brake is maintained together with providing a notification to the exterior of the vehicle, care can be provided promptly to the injured person, and a so-called hit-and-run crime can be prevented.

The present invention is characterized by a method for controlling braking during a collision by which a brake is automatically actuated before a collision or after a collision between a vehicle and an object, comprising a collision detecting step of detecting a collision between the vehicle and the object, a notifying step of issuing a notification to exterior of the vehicle in an event that a collision between the vehicle and the object is detected by the collision detecting step, and a brake maintaining step of maintaining an actuated state of the brake during issuance of the notification in the notifying step.

In the present invention, the notification is issued automatically to the external organization in response to a collision of the vehicle, and the actuated state of the brake is maintained during issuance of the notification. According to the present invention, it is possible to provide a notification to the external organization immediately after the vehicle collision, and during a period while the notification is being made, it is possible to prevent the accident from expanding due to traveling of the vehicle. Further, since the actuated state of the brake is maintained and the vehicle is incapable of traveling during the notification, fleeing of an ill-intentioned driver from the scene of the accident can be prevented.

Further, in the present invention, there may further be provided a brake releasing step of releasing maintenance of the actuated state of the brake after the notification by the notifying step is completed. If the actuated state of the brake is released upon completion of the notification, as in the present invention, it is possible to reliably notify the external organization, and further to reliably prevent an ill-intentioned driver from fleeing from the scene of the accident.

Further, in the present invention, there may further be provided an object recognizing step of recognizing the object, wherein, in the notifying step, the notification is issued to the exterior of the vehicle in an event that the object recognized by the object recognizing step is a human being, and in the brake maintaining step, the actuated state of the brake is maintained in the event that the recognized object is a human being. As in the present invention, in the event that the object having collided with the vehicle is a human being, and if the actuated state of the brake is maintained together with providing a notification to the exterior of the vehicle, care can be provided promptly to the injured person, and a so-called hit-and-run crime can be prevented.

According to the present invention, it is possible to provide a notification to the external organization immediately after the vehicle collision, and during a period while the notification is being made, it is possible to prevent the accident from expanding due to traveling of the vehicle. Further, since the actuated state of the brake is maintained and the vehicle is incapable of traveling during the notification, fleeing of an ill-intentioned driver from the scene of the accident can be prevented.

BRIEF DESCRIPTION OF DRAWINGS

FIG. 2 is a flowchart of a process performed in the present embodiment.

DESCRIPTION OF EMBODIMENTS

Figure 1:
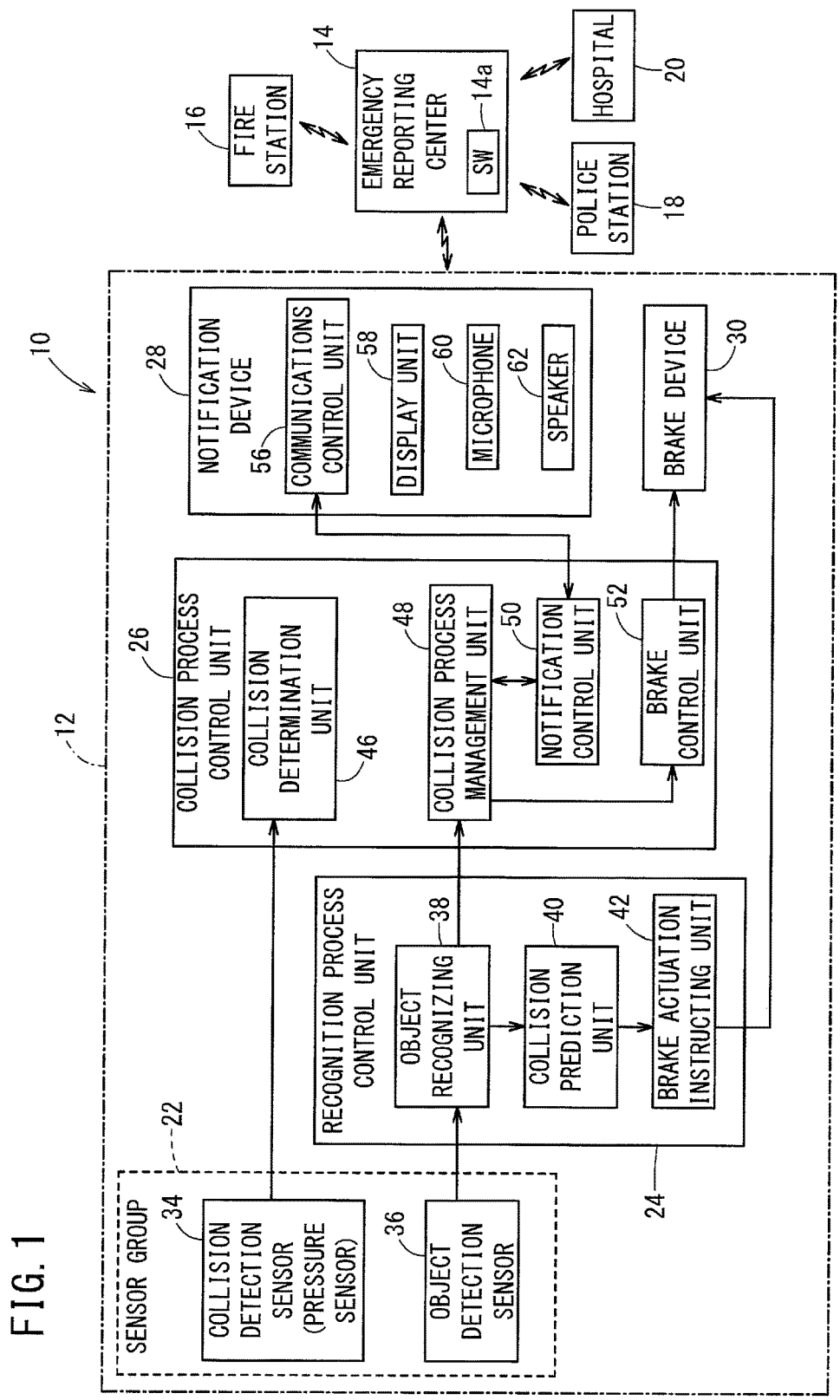
FIG. 1 is a functional block diagram of a device for controlling braking during a collision according to a present embodiment.

Preferred embodiments of a device and method for controlling braking during a collision according to the present invention will be described in detail below with reference to the accompanying drawings.

As shown in FIG. 1, the device for controlling braking during a collision 12, which is provided in a vehicle 10, notifies an emergency reporting center 14 when the vehicle 10 collides with an object. The emergency reporting center 14 appropriately notifies other external institutions, such as a fire station 16, a police station 18, a hospital 20, or the like.

Configuration of Device for Controlling Braking During a Collision 12

The device for controlling braking during a collision 12 includes a sensor group 22 for detecting various information, a recognition process control unit 24 that carries out a recognition process of an object and a process responsive to the recognition process, a collision process control unit 26 that carries out various processes at the time a collision occurs, a notification device 28 that issues a notification to the emergency reporting center 14, and a brake device 30 that brakes the vehicle wheels (not shown). The sensors of the sensor group 22 and the recognition process control unit 24 are connected by a local CAN. A collision detection sensor 34 of the sensor group 22 and the collision process control unit 26 are connected together over a dedicated line. The recognition process control unit 24 and the collision process control unit 26, as well as the collision process control unit 26 and the notification device 28 are connected by an FCAN.

The sensor group 22 includes a collision detection sensor 34 that detects a collision occurring in the vehicle 10, and an object detection sensor 36 that detects an object in front of the vehicle 10.

As the collision detection sensor 34, for example, a pressure sensor or an acceleration sensor can be used. Hereinafter, an embodiment using a pressure sensor 34 will be described. The pressure sensor 34 is disposed in the front of the vehicle 10, for example, in a bumper, and detects a pressure generated in the bumper due to a collision or the like. In the case that the object that collides with the vehicle 10 is a human being, the collision position is narrower in comparison with a case in which the object is another vehicle, and further, the pressure at the time of the collision is smaller. Therefore, in order to reliably detect a collision with a human being, it is preferable for a plurality of pressure sensors 34 to be provided at multiple positions in the front of the vehicle 10.

The object detection sensor 36 comprises devices such as millimeter wave radar, microwave radar, laser radar, an infrared sensor, an ultrasonic sensor, a monocular camera, a stereo camera, and the like, which actively detect objects in front of the vehicle 10 and forward environmental information. In order to improve the detection accuracy of objects and environmental information, it is preferable for a plurality of such devices to be provided.

The recognition process control unit 24 is constituted by an ECU. The ECU is a computational device containing a microcomputer, and includes a CPU (Central Processing Unit), and as a memory, a ROM (including an EEPROM), a RAM (Random Access Memory) and the like. In addition thereto, the ECU includes input/output devices such as an A/D converter, a D/A converter, and the like, and a timer serving as a timekeeping unit, etc. By the CPU reading out and executing programs stored in the ROM, the ECU functions as various function realizing units (function realizing means), for example, a control unit, a computing unit, a processing unit, etc. In the present embodiment, the ECU that constitutes the recognition process control unit 24 functions as an object recognizing unit 38, a collision prediction unit 40, and a brake actuation instructing unit 42. The ECU may be divided into a plurality of ECUs, or may be integrated with an ECU of the collision process control unit 26, to be described later.

The object recognizing unit 38 is configured to recognize and identify objects and environmental information located in front of the vehicle 10 on the basis of sensor information detected by the object detection sensor 36. Furthermore, the object recognizing unit 38 is configured to recognize information such as the distance from the vehicle 10 to the object, the relative velocity of the vehicle 10 and the object, and the lateral position of the object, etc. For example, respective items of information may be recognized on the basis of an image captured by the camera of the object detection sensor 36, or respective items of information can be recognized using a so-called fusion system which is adapted to process information of the radar and the camera in an integrated manner.

The collision prediction unit 40 is configured to predict the possibility of a collision based on the distance from the vehicle 10 to an object that is recognized by the object recognizing unit 38, and the relative velocity between the vehicle 10 and the recognized object. The brake actuation instructing unit 42 is configured to transmit a brake actuation command to the brake device 30, in the event it is predicted by the collision prediction unit 40 that there is a possibility of a collision.

The collision process control unit 26 is constituted by an ECU, in the same manner as the recognition process control unit 24. In the present embodiment, the ECU that constitutes the collision process control unit 26 functions as a collision determination unit 46, a collision process management unit 48, a notification control unit 50, and a brake control unit 52.

The collision determination unit 46 is configured to determine whether or not a collision has occurred on the basis of the pressure information detected by the pressure sensor 34. On the basis of information from the object recognizing unit 38 and the collision determination unit 46, the collision process management unit 48 manages a communications state carried out between the notification device 28 and the emergency reporting center 14, as well as the actuation state of the brake device 30. The notification control unit 50 is configured to transmit a notification command to the notification device 28, and further, to receive a report completion notification from the notification device 28. The brake control unit 52 is configured to transmit a brake maintenance command and a brake release command to the brake device 30.

The notification device 28 comprises a communications control unit 56 for establishing a communications connection by way of wireless communications (over a mobile communications network or a public communications network) with an external organization including the emergency reporting center 14, together with executing various processes related to the communications connection. In addition, the notification device 28 comprises a display unit 58 for displaying information regarding the communications connection, a microphone 60, and a speaker 62. The communications control unit 56 is a computer, and operates as various functional units by a CPU (Central Processing Unit) thereof executing programs stored in a storage unit. By execution of such programs, it is possible to carry out an automatic notification to the emergency reporting center 14, and to enable a telephone call with the emergency reporting center 14 using the microphone 60 and the speaker 62. The notification device 28 is configured, for example, by a car navigation system.

The brake device 30 is constituted from a non-illustrated brake actuator that is operated in accordance with commands transmitted from the brake actuation instructing unit 42 and the brake control unit 52, and a friction brake that switches between being actuated and released by operation of the brake actuator.

The emergency reporting center 14 is provided with a switch (SW) 14a for suspending communications, and by an operator manipulating the SW 14a, communications are suspended.

Operations of Device for Controlling Braking During a Collision 12

Operations of the device for controlling braking during a collision 12 will be described using the process flowchart shown in FIG. 2. In step S1, the sensor group 22 detects various kinds of information. Detection of various information is carried out continuously at predetermined time intervals, for example, at each of extremely short time intervals of ms (milliseconds) during the execution of processes in accordance with the flowchart of FIG. 2.

In step S2, the object recognizing unit 38 receives information detected by the object detection sensor 36, and recognizes objects and environmental information in front of the vehicle 10. Furthermore, if an object is recognized, the object recognizing unit 38 identifies whether or not the object is a human being. Further, the distance and the relative velocity, etc., between the vehicle 10 and the object are recognized.

In step S3, the collision prediction unit 40 predicts that there is a possibility for a collision to occur (step S3: YES) in the event that the distance between the vehicle 10 and the object recognized by the object recognizing unit 38 is less than a predetermined distance, and the relative velocity is greater than or equal to a predetermined velocity. In this case, the process proceeds to step S4. On the other hand, in the event that the distance between the vehicle 10 and the object recognized by the object recognizing unit 38 is greater than or equal to the predetermined distance, or the relative velocity is less than the predetermined velocity, the collision prediction unit 40 predicts that there is no possibility for a collision to occur (step S3: NO). In this case, the process returns to step S1.

In step S4, the brake actuation instructing unit 42 transmits a brake actuation command to the brake device 30, so that a deceleration can be obtained corresponding to the distance and the relative speed between the vehicle 10 and the object. The brake actuator of the brake device 30 is actuated in response to the brake actuation command, and thereby actuates the friction brake. In addition, the vehicle 10 attempts to avoid a collision with the object.

In step S5, the collision determination unit 46 receives the pressure information transmitted from the pressure sensor 34, and determines whether or not the vehicle 10 and the object have actually collided. In the case that the vehicle 10 has collided with the object in spite of the brake device 30 having been actuated, the pressure sensor 34 detects a pressure that is greater than or equal to a predetermined value. If the pressure sensor 34 has detected a pressure greater than or equal to the predetermined value, the collision determination unit 46 determines that a collision has occurred (step S5: YES). In this case, the process proceeds to step S6. On the other hand, if a collision between the vehicle 10 and the object is avoided by actuation of the brake device 30, the pressure sensor 34 detects a pressure that is less than the predetermined value. If the pressure sensor 34 has detected a pressure less than the predetermined value, the collision determination unit 46 determines that a collision has not occurred (step S5: NO). In this case, the process proceeds to step S7. In step S7, the brake control unit 52 transmits a brake release command to the brake device 30. Then, the process returns to step S1.

In step S6, the collision process management unit 48 determines whether or not a notification to the emergency reporting center 14 is necessary. In this instance, the need for such a notification is determined based on whether or not the object that collided with the vehicle 10 is a human being. The collision process management unit 48 receives an identification result of the object which was carried out by the object recognizing unit 38, and determines whether or not the object is a human being. If the object is a human being, then it is determined that there is a need to provide a notification (step S6: YES). In this case, the process proceeds to step S8. On the other hand, if the object is not a human being, then it is determined that a notification is unnecessary (step S6: NO). In this case, the process proceeds to step S7. In step S7, the brake control unit 52 transmits a brake release command to the brake device 30. Then, the process returns to step S1.

In step S8, the notification control unit 50 transmits a notification command to the notification device 28. The notification device 28 initiates a notification program in accordance with the notification command, and establishes a communications connection with the emergency reporting center 14. In addition, via the microphone 60 and the speaker 62, the notification device 28 enables a telephone conversation to take place between the driver in the vehicle 10 and an operator on the side of the emergency reporting center 14.

In step S9, the collision process management unit 48 manages the brake control unit 52, so that the actuated state of the brake device 30 is maintained during the notification (while communications are carried out in the connected state). At this time, the brake control unit 52 transmits the brake maintenance command to the brake device 30. Moreover, in the case that the actuated state of the brake is maintained until the brake device 30 receives the brake release command, the brake control unit 52 need not necessarily transmit the brake maintenance command. At this time, the brake actuator of the brake device 30 maintains the actuated state of the brake, and the friction brake is also maintained in an actuated state.

In step S10, the collision process management unit 48 determines whether or not the notification to the emergency reporting center 14 has been completed. When the notification is completed, the operator on the side of the emergency reporting center 14 operates the SW 14*a*, and thereby suspends communications with the driver. When communications are suspended, the notification device 28 transmits a report completion notification to the notification control unit 50. If the notification control unit 50 receives the report completion notification, the collision process management unit 48 determines that the notification has been completed (step S10: YES). In this case, the process proceeds to step S11. On the other hand, if the notification control unit 50 does not receive the report completion notification, the collision process management unit 48 determines that the notification is continuing to be made (step S10: NO). In this case, the process returns to step S9, and the actuated state of the brake device 30 is maintained.

In step S11, the brake control unit 52 transmits a brake release command to the brake device 30. The brake actuator of the brake device 30 operates in response to the brake release command, and thereby releases the friction brake.

Summary of the Present Embodiment

The present embodiment relates to a device for controlling braking during a collision 12, which is adapted to automatically actuate a brake (brake device 30) before a collision (or after a collision) takes place between the vehicle 10 and an object. The device for controlling braking during a collision 12 according to the present embodiment comprises the collision detecting unit (pressure sensor 34, collision determination unit 46) that detects a collision between the vehicle 10 and the object, the notification unit (notification control unit 50, notification device 28) that issues a notification to the exterior of the vehicle (emergency reporting center 14) in the event that a collision between the vehicle 10 and the object is detected by the collision detecting unit (pressure sensor 34, collision determination unit 46), and a brake control unit 52 that maintains the actuated state of the brake (brake device 30) during issuance of the notification by the notification unit (notification control unit 50, notification device 28).

Furthermore, the present embodiment includes the collision detecting step (step S5) of detecting a collision between the vehicle 10 and the object, the notifying step (step S8) of issuing a notification to the exterior of the vehicle in the event that a collision between the vehicle 10 and the object is detected by the collision detecting step (step S5), and the brake maintaining step (step S9) of maintaining the actuated state of the brake device 30 during issuance of the notification in the notifying step (step S8).

According to the present embodiment, it is possible to provide a notification to the external organization such as the emergency reporting center 14 immediately after the collision of the vehicle 10, and during a period while the notification is being made, it is possible to prevent the accident from expanding due to traveling of the vehicle 10. Further, since the actuated state of the brake device 30 is maintained and the vehicle 10 is incapable of traveling during the notification, fleeing of an ill-intentioned driver from the scene of the accident can be prevented.

Further, in the present embodiment, the brake control unit 52 may release maintenance of the actuated state of the brake device 30 after notification by the notification unit (notification control unit 50, notification device 28) is completed. In the present embodiment, since the brake device 30 is released upon completion of the notification, it is possible to reliably issue a notification to the emergency reporting center 14. Further, it is possible to reliably prevent an ill-intentioned driver from fleeing from the scene of the accident.

The present embodiment is further equipped with the object recognizing unit 38 that recognizes an object. The notification unit (notification control unit 50, notification device 28) issues a notification to the exterior of the vehicle in the event that the object recognized by the object recognizing unit 38 is a human being. Further, the brake control unit 52 maintains the actuated state of the brake device 30 in the event that the object recognized by the object recognizing unit 38 is a human being. According to the present embodiment, in the event that the object having collided with the vehicle 10 is a human being, the actuated state of the brake device 30 is maintained together with providing a notification to the emergency reporting center 14, and therefore, care can be provided promptly to the injured person. Further, a so-called hit-and-run crime can be prevented.

Further, according to the present embodiment, the communications connection is maintained until the operator on the side of the emergency reporting center 14 suspends the communication. In this manner, since it is ensured that communications cannot be suspended from the driver's side, it is possible to reliably prevent an ill-intentioned driver from fleeing from the scene of the accident.

Other Embodiments

The present invention is not limited to the embodiment discussed above, and it is a matter of course that various configurations could be adopted therein without departing from the essence and gist of the present invention. For example, in the above-described embodiment, as indicated in step S6 of FIG. 2, the need for providing a notification is determined based on whether or not the object that collided with the vehicle 10 is a human being. However, the need for providing a notification may be determined on the basis of other conditions apart from whether or not the object is a human being.

Further, it is also possible to omit the judgment itself indicated in step S6 of FIG. 2 of the need for providing the notification. In this case, the communications connection with the emergency reporting center 14 is established at a point in time that the vehicle 10 collides with any type of object.

In the above-described embodiment, although the communications connection is established between the notification device 28 and the emergency reporting center 14 when a collision occurs, at this time, accident information concerning the vehicle 10 may also be automatically transmitted to the emergency reporting center 14. In a self-inflicted accident, cases occur in which the driver cannot make a telephone call and operate the vehicle 10. Even in such cases, it is possible to report the accident while maintaining the actuated state of the brake device 30.

In the above-described embodiment, the emergency reporting center 14 is automatically notified at the time of the occurrence of a collision. However, a notification may also be made directly to other external organizations, such as the fire station 16, the police station 18, the hospital 20, or the like.

Further, in the above-described embodiment, a collision between the vehicle 10 and an object is detected by the pressure sensor 34 and the collision determination unit 46. However, a collision may be detected by the object detection sensor 36, the object recognizing unit 38, and the collision prediction unit 40. For example, at a point in time when the distance between the vehicle 10 and the object as recognized by the object recognizing unit 38 becomes substantially zero, the collision prediction unit 40 estimates that a collision has occurred.

Further, in the above-described embodiment, as shown in steps S3 and S4 of FIG. 2, the brake device 30 is automatically actuated in order to avoid a collision before a collision takes place. However, the brake device 30 may be actuated automatically responsive to the occurrence of a collision. In this case, the processes of step S3 and step S7 become unnecessary. Further, the order of the process of step S4 and the process of step S5 is switched. Further, the collision prediction unit 40 and the brake actuation instructing unit 42 shown in FIG. 1 become unnecessary.

Further, with the above-described embodiment, the SW 14a is provided on the side of the emergency reporting center 14 for suspending communications. However, it is also possible to provide a switch for suspending communications on the side of the vehicle 10.

The invention claimed is:

1. A device for controlling braking during a collision adapted to automatically actuate a brake before the collision or after the collision between a vehicle and an object, comprising:
   a collision detecting sensor configured to detect the collision between the vehicle and the object;
   a first processor configured to control the brake; and
   a second processor configured to establish a wireless communication with an external communications device,
   wherein the second processor issues a notification to the external communications device through the wireless communication established in response to a notification command from the first processor, and transmits a report completion notification to the first processor when the wireless communication is suspended by the external communications device,
   wherein the first processor transmits the notification command to the second processor while maintaining an actuated state of the brake in response to detection of the collision detected by the collision detecting sensor, and releases maintenance of the actuated state of the brake in response to receiving the report completion notification from the second processor.

2. The device for controlling braking during the collision according to claim 1, further comprising:
   an object detection sensor configured to detect the object in front of the vehicle;
   wherein the first processor is configured to recognize the object based on a detection result by the object detection sensor, and issue the notification command to the second processor while maintaining the actuated state of the brake in an event that the collision is detected by the collision detecting sensor and the object is recognized as a human being.

3. A method for controlling braking during a collision by which a brake is automatically actuated before the collision or after the collision between a vehicle and an object, comprising:
   a collision detecting step of detecting the collision between the vehicle and the object by a collision detecting sensor;
   a brake maintaining step of, using a first processor, transmitting a notification command from a first processor to a second processor while maintaining an actuated state of the brake in response to detection of the collision detected by the collision detecting sensor in the collision detecting step;
   a notifying step of, using the second processor, establishing a wireless communication with an external communications device and issuing a notification to the external communications device through the wireless communication established in response to the notification command from the first processor in the brake maintaining step, and transmitting a report completion notification to the first processor when the wireless communication is suspended by the external communications device; and
   a brake releasing step of, using the first processor, releasing maintenance of the actuated state of the brake in response to the receiving the report completion notification from the second processor in the notifying step.

4. The method for controlling braking during the collision according to claim 3, further comprising:
   an object detection step of detecting the object in front of the vehicle by an object detection sensor; and
   an object recognizing step of, using the first processor, recognizing the object based on a detection result by the object detection sensor in the object detection step;
   wherein, in the notifying step, the notification command is issued by the first processor to the second processor, while maintaining the actuated state of the brake, in an event that the collision is detected by the collision detecting sensor in the collision detecting step and the object is recognized as a human being in the object recognizing step.

* * * * *